US011188883B2

(12) United States Patent
Christidis et al.

(10) Patent No.: US 11,188,883 B2
(45) Date of Patent: Nov. 30, 2021

(54) USING LEDGER SENSORS TO ENABLE CONTEXTUAL CONTRACTS ACROSS VARIOUS ENTERPRISE BLOCKCHAIN APPLICATIONS

(71) Applicant: International Business Machines Corporation, Armonk, NY (US)

(72) Inventors: Konstantinos Christidis, Durham, NC (US); Anna D. Derbakova, Durham, NC (US); Nitin Gaur, Austin, TX (US); Praveen Jayachandran, Bangalore (IN); Srinivasan Muralidharan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 15/274,296

(22) Filed: Sep. 23, 2016

(65) Prior Publication Data
US 2018/0089638 A1   Mar. 29, 2018

(51) Int. Cl.
| G06Q 20/02 | (2012.01) |
| G06Q 20/38 | (2012.01) |
| G06Q 10/06 | (2012.01) |
| G06Q 20/06 | (2012.01) |
| H04L 9/32  | (2006.01) |

(52) U.S. Cl.
CPC ......... *G06Q 20/02* (2013.01); *G06Q 10/063* (2013.01); *G06Q 10/0639* (2013.01); *G06Q 20/065* (2013.01); *G06Q 20/389* (2013.01); *G06Q 20/3827* (2013.01); *G06Q 20/3829* (2013.01); *H04L 9/3239* (2013.01); *H04L 9/3247* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

2015/0134675 A1* 5/2015 Ellis .................. G06F 16/335
707/754
2015/0379510 A1 12/2015 Smith
(Continued)

*Primary Examiner* — Jamie R Kucab
*Assistant Examiner* — Nicholas K Phan
(74) *Attorney, Agent, or Firm* — Scully, Scott, Murphy & Presser, PC; Jared Montanaro, Esq.

(57) ABSTRACT

A system, method, and computer program product provides contextual contracts across various enterprise blockchain applications. In an aspect of the present disclosure, a method is disclosed including receiving a contextual contract for addition to a blockchain. The contextual contract includes at least one state dependent term. The method further includes appending a block to the blockchain based on the received contextual contract and in response to appending the block, activating a ledger sensor for the contextual contract. The ledger sensor is configured to monitor at least one of the blockchain and at least one other blockchain for transactions that correspond to the at least one term. The method further includes receiving from the ledger sensor data about transactions that corresponding to the at least one term and finalizing the contextual contract by appending a block to the blockchain based on the received data and the contextual contract.

17 Claims, 6 Drawing Sheets

(56) References Cited

U.S. PATENT DOCUMENTS

| | | |
|---|---|---|
| 2016/0028552 A1 | 1/2016 | Spanos et al. |
| 2016/0092988 A1* | 3/2016 | Letourneau |
| 2016/0342977 A1* | 11/2016 | Lam ........................ G06Q 20/38 |
| 2017/0011460 A1* | 1/2017 | Molinari ................. G06Q 40/04 |
| 2017/0046651 A1* | 2/2017 | Lin ......................... G06Q 10/08 |
| 2017/0061347 A1* | 3/2017 | Ganesh ................... G06Q 20/06 |
| 2017/0206326 A1* | 7/2017 | Klein ....................... G06F 19/00 |
| 2017/0243287 A1* | 8/2017 | Johnsrud ............... G06Q 40/025 |
| 2017/0331896 A1* | 11/2017 | Holloway ................ H04L 29/08 |
| 2017/0372392 A1* | 12/2017 | Metnick ................. G06Q 30/06 |
| 2019/0043059 A1* | 2/2019 | Xie ....................... G06Q 20/401 |

* cited by examiner

USING LEDGER SENSORS TO ENABLE CONTEXTUAL CONTRACTS ACROSS VARIOUS ENTERPRISE BLOCKCHAIN APPLICATIONS

TECHNICAL FIELD

The present disclosure relates to blockchains and in particular to enabling contextually aware smart contracts across blockchains.

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain. This process is often called consensus.

Once ordered, the transactions are packaged into blocks which are in turn appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

Recently, the use of blockchain technology has expanded beyond crypto currency, to provide a framework for the execution of smart contracts. Smart contracts are self executing agreements between parties that have all of the relevant covenants spelled out in code, and settle automatically, depending on future signatures or trigger events. By leveraging blockchain technologies, smart contracts, once appended to the blockchain, cannot be revoked, denied, or reversed, since decentralized execution removes them from the control of any one party.

BRIEF SUMMARY

The system, method, and computer program product described herein provides contextual contracts across various enterprise blockchain applications.

In an aspect of the present disclosure, a method is disclosed. The method includes receiving a contextual contract for addition to a blockchain. The contextual contract includes at least one term. The method further includes appending a block to the blockchain based on the received contextual contract and in response to appending the block, activating a ledger sensor for the contextual contract. The ledger sensor is configured to monitor at least one of the blockchain and at least one other blockchain for transactions that correspond to the at least one term. The method further includes receiving from the ledger sensor data about transactions that corresponds to the at least one term and finalizing the contextual contract by appending a block to the blockchain based on the received data and the contextual contract.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
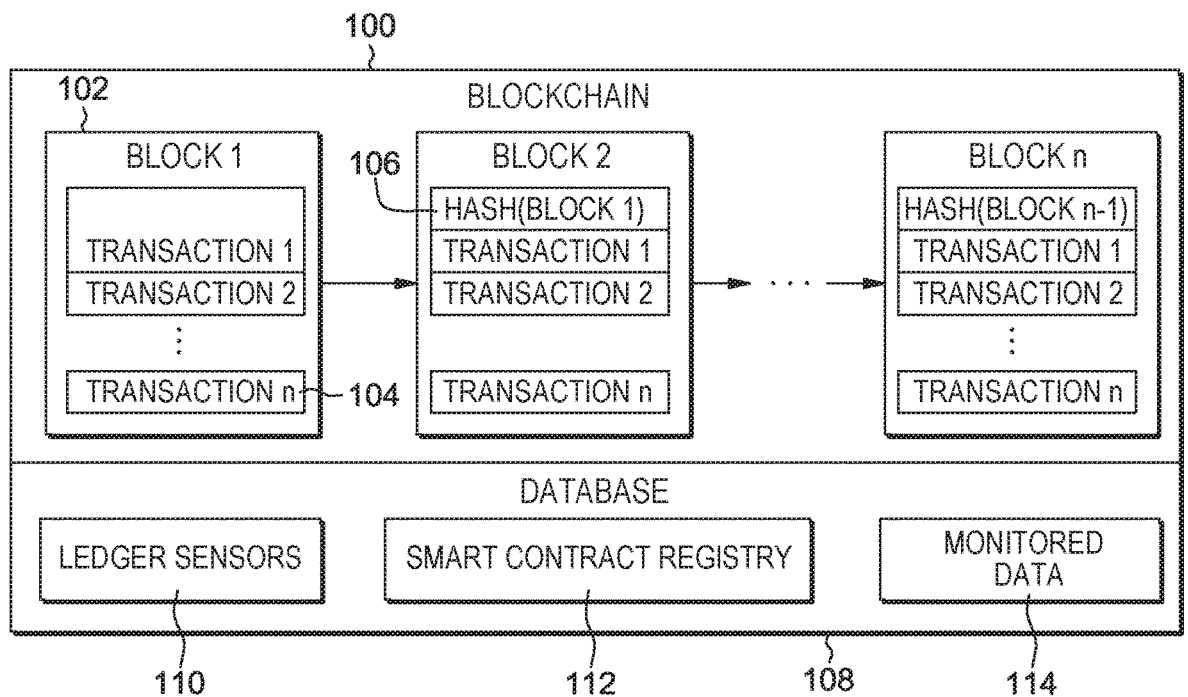
FIG. 1 is a system diagram illustrating a blockchain in accordance with an aspect of the present disclosure.

Smart contracts deployed on blockchains are often limited in both scope and reach because they are static and are not context aware. For example, a generic smart contract that is appended to a blockchain may only be executable based on information explicitly passed to it from other transactions that are also appended to the same blockchain. In a business enterprise environment, however, the use of a single blockchain for every aspect of the business may not be tenable. Further, even within a single blockchain, smart contracts are incapable of monitoring and extracting state information maintained in the ledger.

In some aspects, an enterprise may wish to deploy a separate blockchain for one or more of the enterprise's business unit silos. For example, a smart contract for the sale of a good or service may be appended to a contracts blockchain associated with a contracts business unit of the enterprise. A received payment transaction for the good or service based on the contract, however, may be appended to an accounts receivable blockchain associated with an accounts receivable business unit of the enterprise. However, because the smart contract for the sale is not context aware, the smart contract has no way of knowing that the payment associated with the smart contract has been received and appended to the accounts receivable blockchain.

The present disclosure provides contextual contracts across various inter-enterprise and intra-enterprise blockchain applications. Contextual contracts are smart contracts that include state dependent terms. The state dependent terms may be based on events that occur in the future. For example, a contextual contract may include a term that party A receives 10% of the sales of a product sold by party B. At the time that the contextual contract is validated and appended to the blockchain 100, the future sales of the product are not known. The receipt of 10% of the sales of a product may be considered a state dependent term. As another example, a company X may enter into a contextual contract pledging to donate $1 to charity Y for every product sold by its participating retail stores in a given month. At the time of deployment of the contextual contract (start of the contract period and appending of the contract to the blockchain), the amount of money that will be donated by company X is unknown. At the time of final contract execution (as stipulated by the terms of the contextual contract), the only way to determine the amount of money that company X has to transfer, is to look through the ledger of the blockchain for the quantity of products sold across different retail stores (each being a different contract between the retail store and end customers). The determination of the number of products sold may be an example of a state dependent term. A ledger sensor may be activated by the contextual contract to search through one or more blockchains for data corresponding to the contextual contract. Ledger sensors are described in more detail below.

Contextual contracts may be useful in many different circumstances to allow for the tracking of transactions, smart contracts, etc. In an example, a bank may utilize a contextual contract to track information related to a mortgagee. The contextual contract may monitor the financial performance of the company (e.g., is the company paying interest regularly for all its loans across multiple banks, is it paying its suppliers on time) using a ledger sensor. The bank may use this information to make future lending decisions for the company. In some aspects, a consortium of banks could use the same ledger sensor to monitor performance of the company across all of its lending contracts.

In another example, a contextual contract and ledger sensor may be useful to donors of a non-profit company. For example, when different donors donate large sums of money to the company, they would like to track the expenses paid to various sources by the company. The donors may also be interested to know how much money the non-profit has left at the end of the fiscal year. Typically, if non-profits do not use up to a required amount, some of the funding gets decreased. The ledger sensor may monitor the company and report that information to a contextual contract.

In another example, a credit card company may offer a promotion "Spend $X across brands/sites A, B, C in a given month and get cash back of $Y." This may be submitted to a blockchain as a contextual contract where the final execution of the contextual contract will be based on the actual spending as monitored by a ledger sensor. For example, the ledger sensor will monitor purchases across these brands and determine the cumulative amount spent. For example, each purchase may be a transaction on a ledger that is monitored by a ledger sensor.

In another example, contextual contracts and ledger sensors may be used in voting. Voters may cast votes by submitting them for addition to a blockchain. Different ledger sensors may count the submitted votes based on different criteria (e.g., location, demographic identifiers, gender, ethnicity, party affiliation, etc. of the voters). The contextual contracts may monitor the voting using the ledger sensors and may determine the outcome of an election based on the monitoring. Contextual contracts may also be used to generate plots/graphs based on the data.

With reference now to FIG. 1, a blockchain 100 includes a plurality of blocks 102. Each block 102 is a data structure that includes data representing transactions 104, for example, smart contracts, payment receipts, or any other transaction. As described above, as new transactions 104 are submitted to the blockchain 100 and validated, additional blocks 102 are generated and appended to the blockchain 100. Each new block 102 also includes a hash 106 of the immediately previous block 102. For example, block 2 includes a hash of block 1, block n includes a hash of block n−1, etc.

Figure 2:
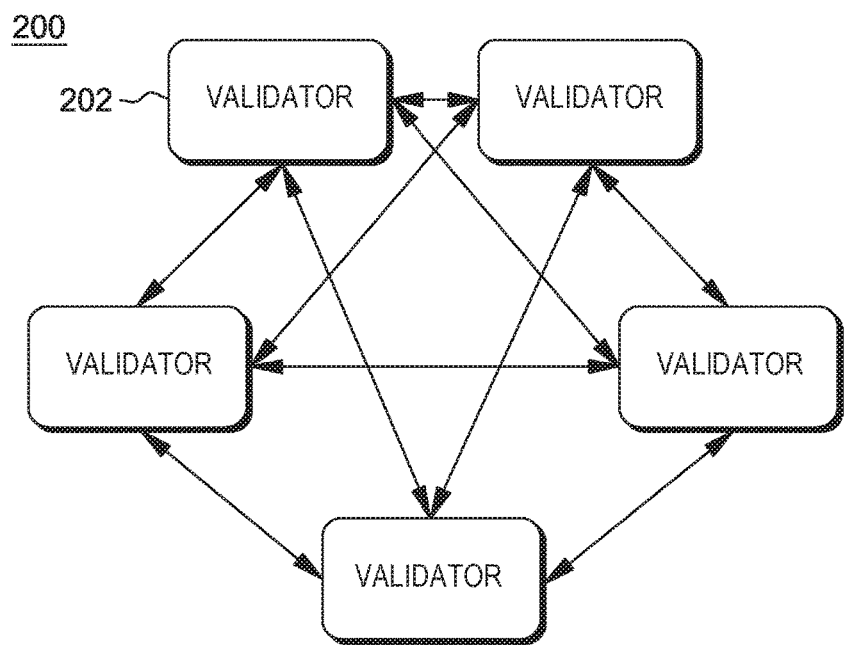
FIG. 2 is a system diagram illustrating validator nodes of the blockchain of FIG. 1 in accordance with an aspect of the present disclosure.
Figure 4:
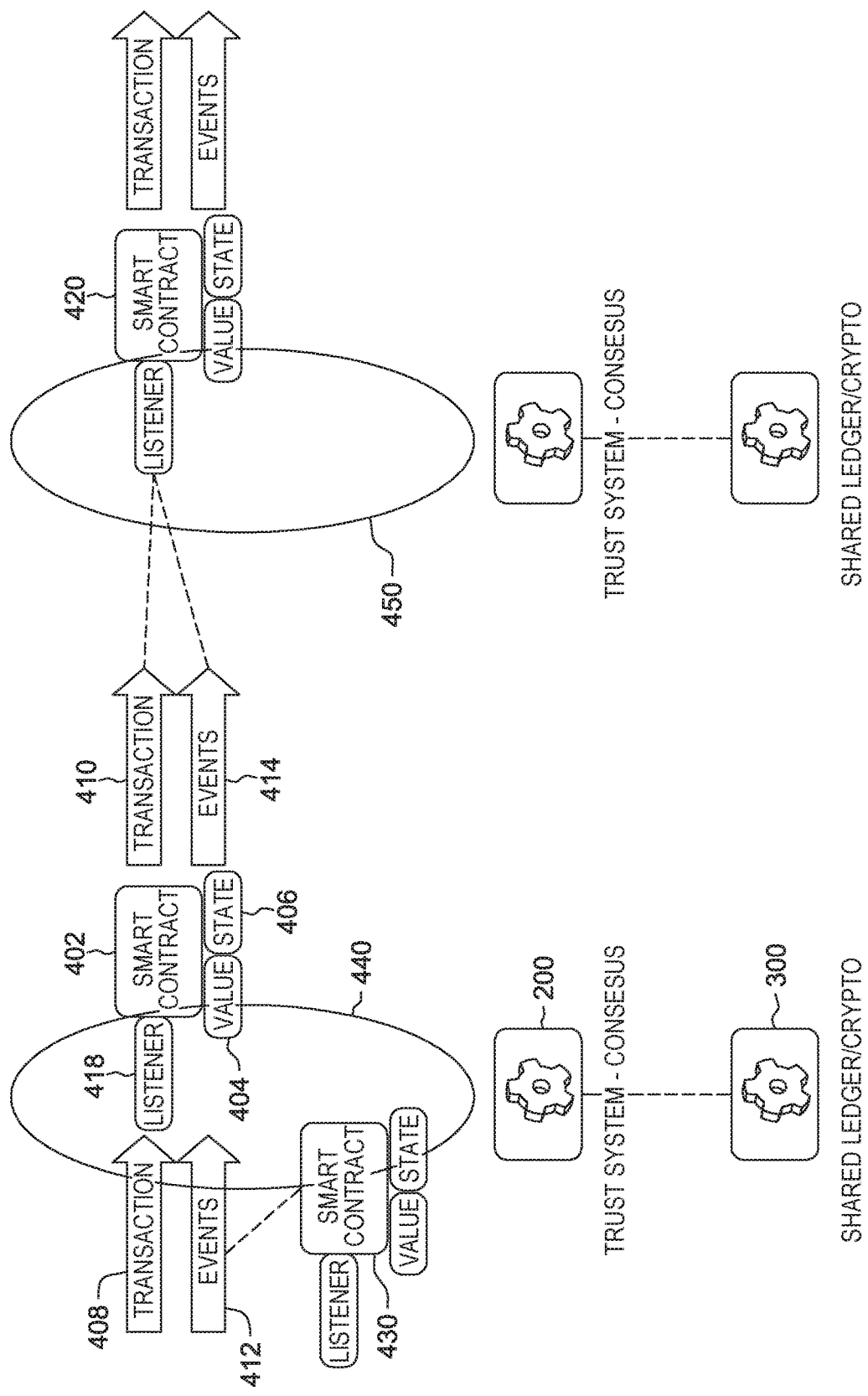
FIG. 4 is a diagram illustrating the interaction between a contextual contract and a ledger sensor in accordance with an aspect of the present disclosure.

With reference now to FIGS. 2 and 4, any transactions submitted to blockchain 100 are validated by a set of validator nodes 200 of blockchain 100. Each validator node 202 performs a series of mathematical computations to determine whether a transaction 104 is valid and also determines whether the transaction complies with the rules of the blockchain. A consensus of the set of validator nodes 200 is required to add the transaction 104 to a block 102 for appending to the blockchain 100.

Figure 3:
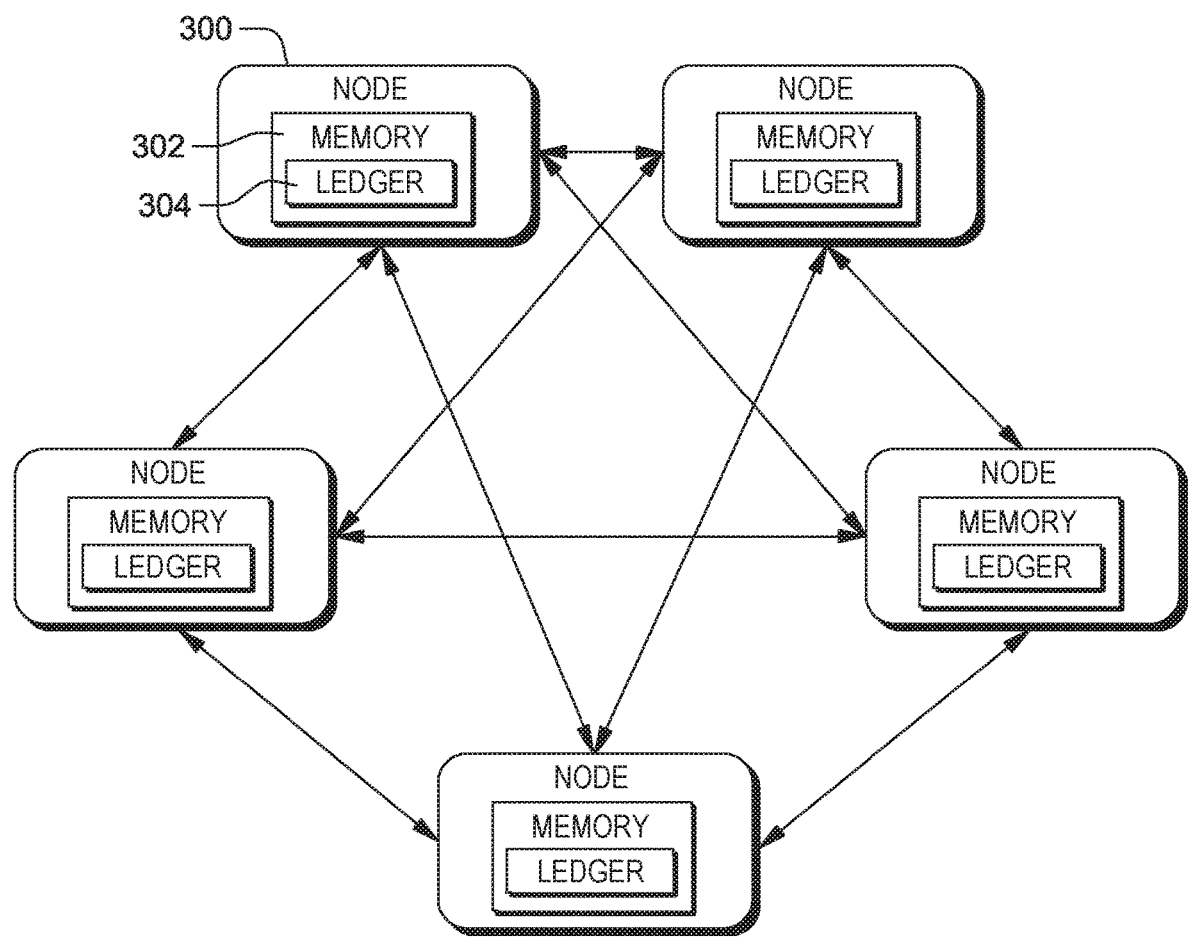
FIG. 3 is a system diagram illustrating nodes storing the ledger of the blockchain of FIG. 1 in accordance with an aspect of the present disclosure.

With reference now to FIGS. 3 and 4, in some aspects, blockchain 100 is stored in a decentralized manner on a plurality of nodes 300. Nodes 300 may each include memory 302 that stores at least a portion of a ledger 304 of blockchain 100. In some aspects, every node 300 may store the entire ledger 304. In some aspects, each node 300 may store a portion of ledger 304. In some aspects, some or all of nodes 300 may be also be validator nodes 200. In some aspects, some or all of blockchain 100 may be stored in a centralized manner.

With reference now to FIG. 4, an example contextual contract 402 is illustrated including a value 404 (e.g., a numerical value, monetary value, or any other value) and a state 406 (e.g., a number of items of a product sold in all retail outlets of a firm, or other similar information that may be dependent on other sources). In some aspects, contextual contract 402 may receive value 404 from a transaction 408, or aggregated from multiple transactions 408, and the value 404 may be sent to another contextual contract 420 via a transaction 410. Contextual contract 402 may also receive information about the state 406 from an event 412, or aggregated from multiple events 412, and the state 406 may be sent as an event 414 to another contextual contract 420. For example, event 412 may be an event associated with a contextual contract 430.

In some aspects, transactions 408, 410 and events 412, 414 may be monitored and shared through the use of listeners or ledger sensors 418. In some aspects, ledger sensors 418 may, for example, be software implemented alongside blockchain 100 that monitor every transaction 408, 410 written to blockchain 100 for information that the ledger sensors 418 is instructed to find. In some aspects, one or more ledger sensors 418 may be activated by a contextual contract 402 when the contextual contract 402 is validated or appended to a blockchain 100. For example, contextual contract 402 may include a term specifying that a ledger sensor 418 should be activated. In some aspects, the appending of any transaction to blockchain 100 may automatically activate a ledger sensors 418.

In some aspects, the contextual contract 402 may include one or more search terms to be used by the ledger sensor 418. In some aspects, ledger sensor 418 may alternatively parse, sensor, or extract relevant search terms from contextual contract 402. For example, ledger sensor 418 may parse the contextual contract 402 for the state information 406 and may monitor other transactions for information related to the state 406 of the contextual contract 402. For example, the search terms may include meta data, key words, terms of the contextual contract 402, applications, enterprise blockchains to be searched, name space, or other criteria, that the activated ledger sensor 418 may use to search for information or data. In some aspects, contextual contract 402 may specify what blockchain ledger sensor 418 will monitor when activated. For example, in some aspects, contextual contract 402 may specify that ledger sensor 418 will monitor blockchain 100. In some aspects, contextual contract 402 may specify that ledger sensor 418 will also or alternatively monitor one or more other blockchains, e.g., other intra-enterprise blockchains, inter-enterprise blockchains, publicly accessible blockchains, etc. In some aspects, the ledger sensor 418 itself will be programmed to monitor a specific blockchain or set of blockchains.

In some aspects, ledger sensors 418 are configured to monitor new transactions, events, contextual contracts, and smart contracts that are appended to a blockchain. In some aspects, ledger sensors 418 may also be configured to monitor transactions, events, contextual contracts, and smart contracts that have already been appended to the blockchain. In some aspects, ledger sensors 418 are configured to monitor transactions, contextual contracts, and smart contracts across multiple blockchains at the same time. For example, ledgers sensors 418 may be configured to monitor blockchain 100 to which contextual contract 402 has been appended, other blockchains associated with the same enterprise that is running blockchain 100, blockchains associated with other enterprises, decentralized blockchains, or any other database that may contain data relevant to the contextual contract 402. For example, ledger sensors 418 may be configured to monitor transactions, events, contextual contracts, and smart contracts appended to blockchains or transactions associated with a first enterprise business silo 440 and a second enterprise business silo 450. In some aspects, the transactions monitored by ledger sensors 418 may be on the same blockchain as the contextual contract 402.

In some aspects, for example, ledger sensors 418 may monitor transactions based on conditions found in the contextual contract 402. For example, if the contextual contract 402 includes a condition that for each time an event occurs, the contextual contract will perform some action, ledger sensors 418 will monitor transactions for the triggering event. If the event has not occurred in a transaction, the ledger sensor 418 will not increment a counter. On the other hand, if the event has occurred in a transaction, the ledger sensor 418 will increment the counter. In this manner, the number of occurrences may be tracked and aggregated across transactions by ledger sensor 418 and may be provided to the contextual contract 402 for later use.

The ledger sensors 418 are configured to determine whether a monitored transaction, contextual contract, or smart contract includes terms, events, values, etc., that are relevant to the contextual contract 402 that activated the ledger sensor 418. In some aspects, the method of determination by ledger sensors 418 may be predetermined in the specification of each ledger sensor 418. For example, the specification of a ledger sensor may specify that the ledger sensor uses string matching, or any other determination criteria based on the particular state information that the ledger sensor 418 must monitor. In some aspects, ledger sensors 418 may determine whether any terms, events, values, or other information of a monitored transaction, contextual contract, or smart contract match the search term specified by the contextual contract 402. Ledger sensors 418 may then provide any terms, events, values, etc. that are determined to match the search terms of the contextual contract 402 to the contextual contract 402 for updating the blockchain that the contextual contract 402 has been appended to. For example, where the contextual contract 402 includes a search term for the sale of a product, the ledger sensor 418 may search other transactions and smart contracts for the sale of the product and capture or aggregate any matching data, e.g., quantity, price, etc., of the sales together. The matching data may then be provided or returned to contextual contract 402 and may be appended to the blockchain 100. For example, ledger sensor 418 may generate a new transaction or an update to the contextual contract 402 including the matching data and may submit the new transaction or update for addition to the blockchain 100. The matching data may be used to finalize contextual contract 402, for example, by submitting a finalized version of the contextual contract 402 based on the matching data to the blockchain 100. In some aspects, contextual contract 402 need not be finalized where, for example, the terms of contextual contract 402 allow contextual contract 402 to periodically make use of the values returned by ledger sensors 418 to execute.

With reference again to FIGS. 1 and 4, in some aspects, the monitored data 114 may be stored in a database 108 associated with blockchain 100. For example, where the contextual contract 402 includes a search term based on sales of a particular product, ledger sensor 418 may aggregate together any sales of the product that it finds in other contextual contracts, smart contracts, or transactions for later use with contextual contract 402. In some aspects, ledger sensors 418 may record the monitored data 114 that matches the search terms in database 108. For example, each sale may be recorded by ledger sensors 418 in database 108, e.g., for later use with contextual contract 402. For example, ledger sensors 418 may count a quantity of items sold across different transactions, contextual contracts, and smart contracts and store the quantity in database 108. In some aspects, database 108 is decentralized where each of the set of nodes 300 includes all or a portion of the database 108. In some aspects, database 108 may be stored separately from nodes 300, e.g., in a separate distributed network, on a server, or in any other location. In some aspects, database 108 may be centralized, e.g., stored by computing devices of a single entity.

In some aspects, database 108 may store monitored data 114 associated with more than one blockchain. For example, database 108 may store monitored data 114 associated with blockchain 100, other blockchains associated with business unit silos of the same enterprise, blockchains associated with other enterprises, public blockchains, etc.

In some aspects, ledger sensor 418 may be a generic ledger sensor 110 that is included in database 108 for use by more than one contextual contract 402. For example, where a certain term, key word, etc. is often used as a search term by more than one contextual contract 402 appended to blockchain 100 or any other blockchain associated with database 108, a generic ledger sensor 110 may be provided as part of database 108 for use by more than one of the contextual contracts 402 at the same time. In some aspects, each ledger sensor 418 may alternatively be generated specifically for the contextual contract 402 that activated it. In some aspects, once a ledger sensor 418 has been activated by a contextual contract 402, the ledger sensor 418 may be added to database 108 for later use by other contextual contracts.

Figure 5:
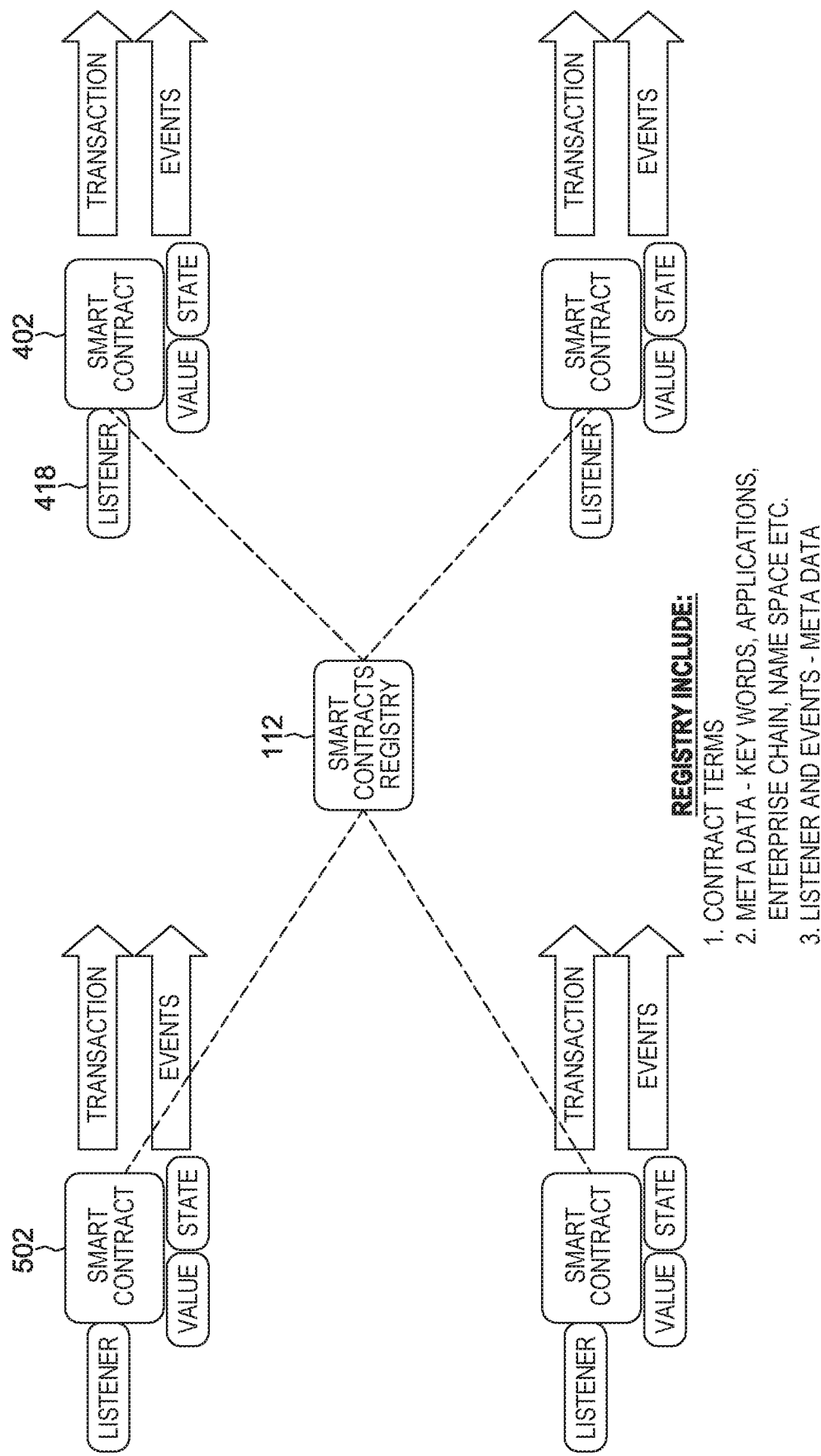
FIG. 5 is a diagram illustrating a smart contract registry in accordance with an embodiment of the present disclosure.

In some aspects, with reference now to FIGS. 1 and 5, database 108 may also include a smart contract registry 112. In some aspects, smart contract registry 112 stores data relating to contextual contracts, smart contracts, and transactions appended to blockchain 100. In some aspects, smart contract registry 112 may also store data relating to contextual contracts, smart contracts, and transactions appended to one or more additional blockchains, e.g., other blockchains associated with business unit silos of the same enterprise, blockchains associated with other enterprises, public blockchains, etc. Smart contract registry 112 may include, for example, a unique identifier associated with each contextual contract, smart contract, and transaction appended to blockchain 100 or any other blockchains for which smart registry 112 stores data. The unique identifier may include a link or other data that may direct a ledger sensor 418 to a particular contextual contract, smart contract, or transaction. In some aspects, smart contract registry 112 may also include a database of contract terms associated with each contextual contract, smart contract, and transaction. For example, a ledger sensor 418 activated by a contextual contract 402 may search smart contract registry 112 for contract terms that match the state dependent search terms provided by contextual contract 402 and may use the unique identifier to find the corresponding contextual contract, smart contract, or transaction 502 that includes the matching contract terms. In some aspects, smart contract registry 112 may also include meta data/key words associated with each contextual contract, smart contract, or transaction. In some aspects, smart contract registry 112 may also include applications associated with each contextual contract, smart contract, or transaction. In some aspects, smart contract registry 112 may also include an identification of the blockchain to which each contextual contract, smart contract, or transaction has been appended. In some aspects, smart contract registry 112 may also include a name space associated with each contextual contract, smart contract, or transaction. In some aspects, contextual contracts, smart contracts, and transactions in one name space may not be able to view or monitor contextual contracts, smart contracts, and transactions in another name space, thereby providing isolation. Smart contract registry 112 may also or alternatively include any other data that may be relevant to, or match the search terms of, a contextual contract 402.

Figure 6:
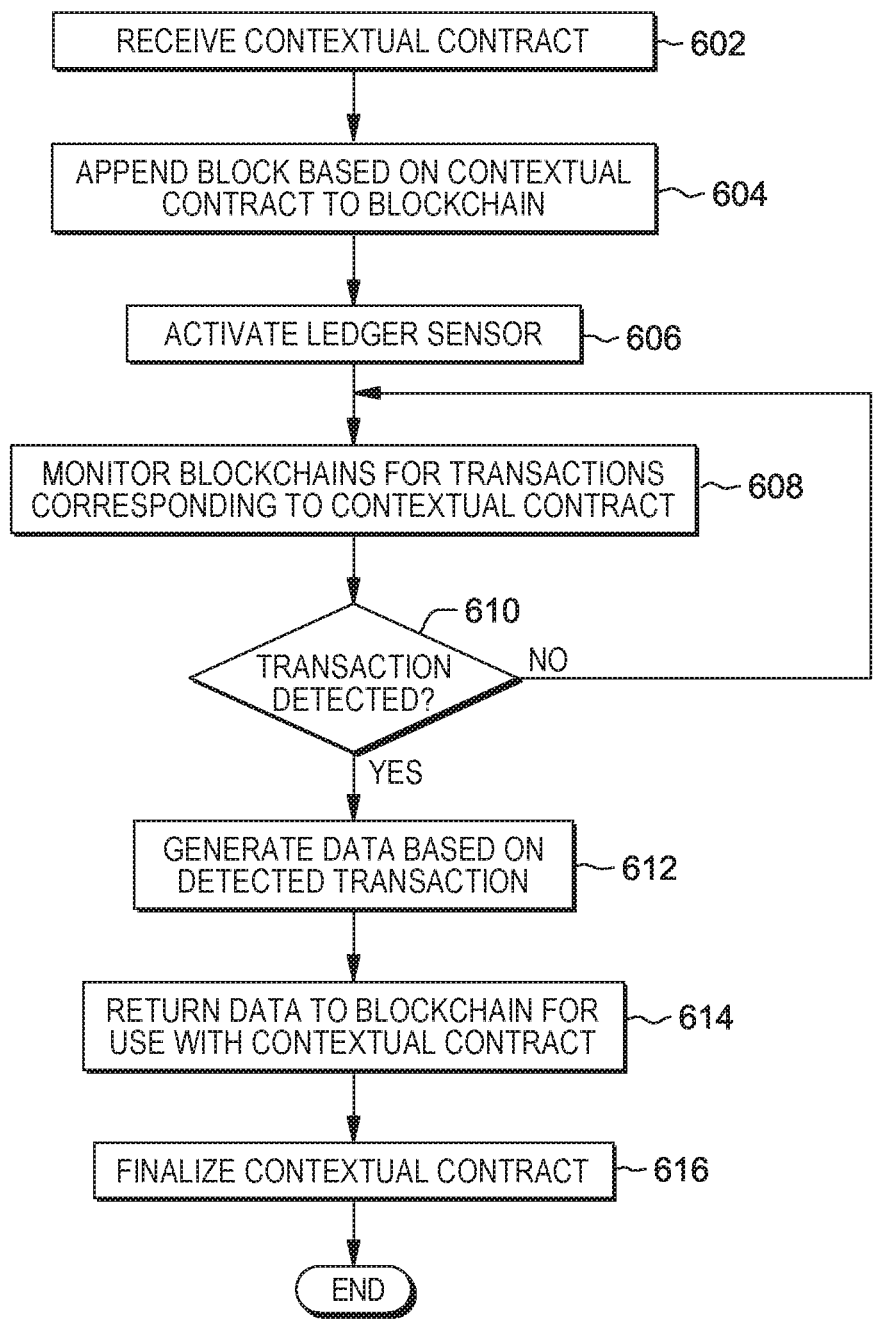
FIG. 6 is a flow chart of a method according to an embodiment of the present disclosure.

With reference now to FIG. 6, a method 600 for using contextual contracts with ledger sensors on a blockchain is disclosed.

At 602, blockchain 100, e.g., one or more validators 200 or nodes 300 of blockchain 100, receives a contextual contract 402 including at least one term for addition to a blockchain 100. For example, the contextual contract 402 may be received by a node 300 of blockchain 100, by a validator 200 of blockchain 100 or by any other portion of blockchain 100.

At 604, a block is appended to the blockchain based on the received contextual contract 402. For example, the validators 200 may validate the contextual contract by reaching a consensus on whether to add the contextual contract to blockchain 100, may add the contextual contract 402 to the next block to be added to the blockchain 100, the previous block may be hashed, the hash may be added to the next block, and the next block may be appended to the blockchain 100.

At 606, a ledger sensor 418 is activated in response to a block containing the contextual contract 402 having been appended to the blockchain 100. In some aspects, the ledger sensor 418 may be activated prior to the block containing the contextual contract 402 being appended to the blockchain 100. In some aspects, the contextual contract includes a term, e.g., an instruction, trigger, etc., specifying that a ledger sensor 418 should be activated. In some aspects, ledger sensor 418 may be activated at the time of deployment. In some aspects, ledger sensors 418 may be activated after a period of delay, e.g., a number of minutes, hours, days, etc. The period of delay may be pre-defined as part of the ledger sensor 418, specified in the contextual contract 402, or set by blockchain 100 itself, for example, in a genesis block of the blockchain 100.

At 608, ledger sensor 418 monitors blockchain 100 for transactions that correspond to the at least one term. In some aspects, ledger sensor 418 may also or alternatively monitor other blockchains for transactions that correspond to the at least one term. For example, ledger sensor 418 may monitor other blockchains associated with business unit silos of the same enterprise, blockchains associated with other enterprises, public blockchains, etc. In some aspects, contextual contract 402 may specify the blockchains that ledger sensor 418 should monitor for the at least one term.

At 610, ledger sensor 418 may detect a transaction that corresponds to the at least one term. For example, ledger sensor 418 may determine that at least one term of the transaction matches the at least one term of the contextual contract, may determine that a value of the transaction corresponds to the at least one contract, or may make other similar determinations. In some aspects, the ledger sensor may detect the transaction by searching smart contract registry 112.

At 612, ledger sensor 418 may generate data based on the comparison including, for example, extracting a value from the transaction that corresponds to the at least one term. In some aspects, ledger sensor 418 may aggregate the values extracted from a plurality of transactions that are determined to correspond to the at least one term. For example, where the at least one term is for the sale of a product and the ledger sensor 418 detects the sale of the product in more than one transaction, the ledger sensor 418 may aggregate the number of sales together in the data. In some aspects, the data may be stored in database 108. The format of the generated data may be arbitrary and based on the particular features of the values that are extracted.

At 614, the data is returned to blockchain 100 for use with contextual contract 402. For example, ledger sensor 418 may return the data to blockchain 100 and may generate and submit a transaction including the data to the blockchain for addition to blockchain 100.

At 616, the contextual contract 402 may be finalized by submitting a transaction based on the contextual contract and the data to blockchain 100 for addition to blockchain 100.

Figure 7:
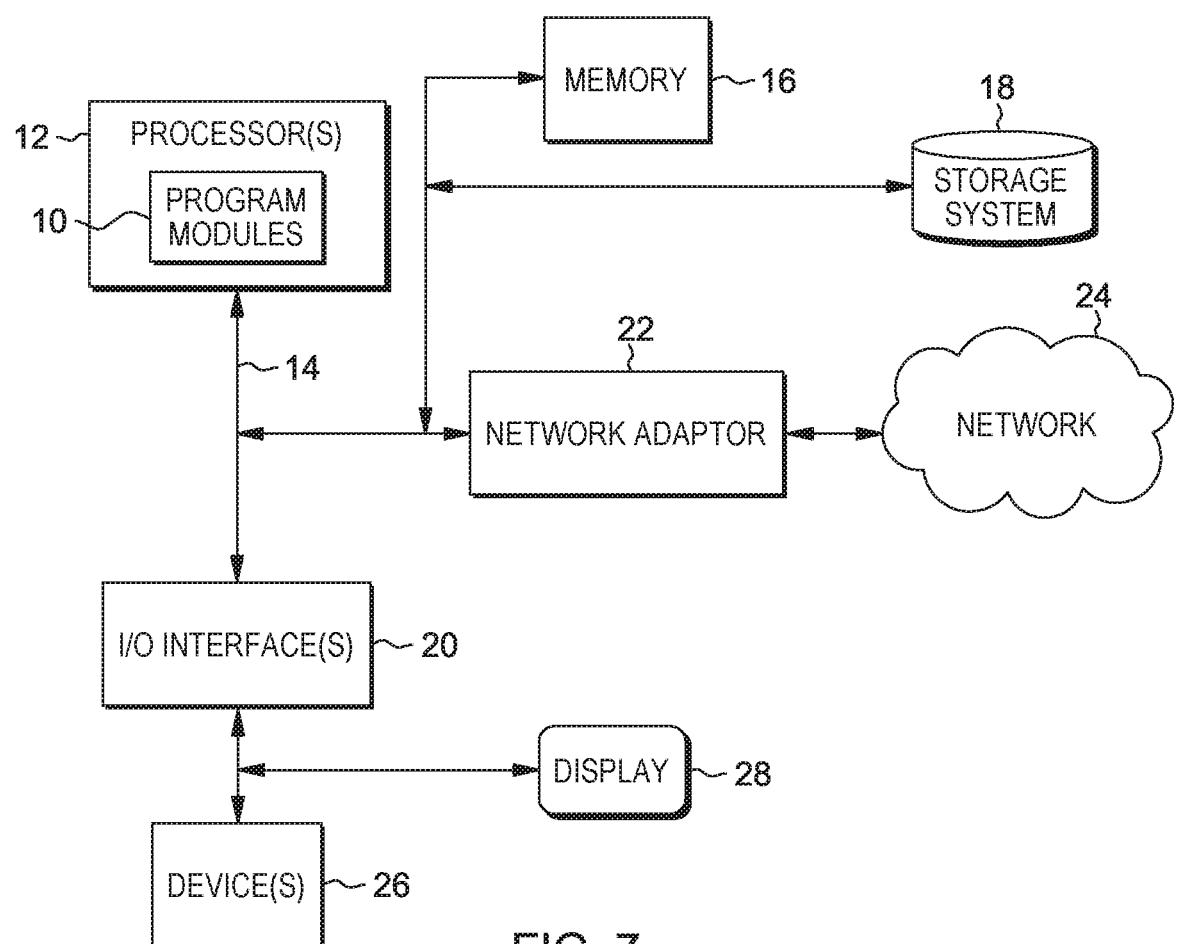
FIG. 7 is an exemplary block diagram of a computer system in which processes involved in the system, method, and computer program product described herein may be implemented.

FIG. 7 illustrates a schematic of an example computer or processing system that may implement any portion of blockchain 100, validators 200, nodes 300, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations.

Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor, comprising:

receiving a contextual contract for addition to a blockchain, the contextual contract specifying a transaction between a first entity and a second entity and including at least one state dependent term that is based on future occurring trigger events;

appending a block to the blockchain based on the received contextual contract, the blockchain deployed at a distributed ledger comprising a database shared by multiple computing nodes participating in a system according to a blockchain protocol, the database storing data associated with transactions between entities and storing smart contract registry data comprising search terms associated with transactions that are appended to at least one blockchain;

in response to appending the block, activating, by the hardware processor, a ledger sensor for the contextual contract;

monitoring, using the ledger sensor, the smart contract registry of the database for the search terms associated with transactions that are appended to at least one of the blockchain and at least one other blockchain responsive to received said future occurring trigger events, said monitoring comprising searching said database for search terms matching the at least one state dependent term provided in said transactions;

extracting, using the ledger sensor, a data value relating to a quantity of items transacted in each said transaction associated with a received trigger event having information corresponding to the at least one state dependent term;

aggregating, using the ledger sensor, the data values extracted from the transactions of received multiple trigger events having said information corresponding to the at least one state dependent term, wherein a data value corresponding to the at least one state dependent term is aggregated by the ledger sensor each time a transaction that corresponds to the at least one state dependent term is appended to at least one of the blockchain and the at least one another blockchain;

generating a new transaction to return, to the contextual contract, from the ledger sensor, an aggregated data value from the data values extracted from the transactions having said information corresponding to the at least one state dependent term;

appending a block to the blockchain based on the new generated transaction having the aggregated data value; and executing the contextual contract by the first entity and a second entity using the aggregated data value returned from the ledger sensor.

2. The method of claim 1, the smart contract registry data of the database further comprising:

identifiers linking to transactions appended to at least one of the blockchain and the at least one other blockchain;

wherein the ledger sensor is configured to monitor at least one of the blockchain and the at least one other blockchain based at least in part on the linking identifier stored in the smart contract registry.

3. The method of claim 2, wherein the database comprising the smart contract registry is a decentralized database.

4. The method of claim 2, wherein the search terms comprise at least one of meta data, key words, applications, enterprise blockchains, and name spaces.

5. The method of claim 1, further comprising:

receiving a second contextual contract for addition to a blockchain, the second contextual contract including the at least one term;

appending a second block to the blockchain based on the received second contextual contract; and in response to appending the second block, activating the same ledger sensor for the second contextual contract based on the second contextual contract including the at least one term.

6. The method of claim 1, wherein the said ledger sensor further performs incrementing a counter in response to detecting the received triggering event, wherein an aggregated data value comprises a counter value of detected triggering events.

7. A system, comprising:

multiple computing nodes participating in a system according to a blockchain protocol, each computing node comprising at least one hardware processor configured to:

receive a contextual contract for addition to a blockchain, the contextual contract specifying a transaction between a first entity and a second entity and including at least one state dependent term that is based on future occurring trigger events;

append a block to the blockchain based on the received contextual contract, the blockchain deployed at a distributed ledger comprising a database shared by the multiple computing nodes, the database storing data associated with transactions between entities and storing smart contract registry data comprising search terms associated with transactions that are appended to at least one blockchain;

in response to appending the block, activate a ledger sensor for the contextual contract;

monitor, using the ledger sensor, the smart contract registry of the database for the search terms associated with transactions that are appended to at least one of the blockchain and at least one other blockchain responsive to received said future occurring trigger events, said monitoring comprising searching said database for search terms matching the at least one state dependent term provided in said transactions;

extract, using the ledger sensor, a data value relating to a quantity of items transacted in each said transaction associated with a received trigger event having said information corresponding to the at least one state dependent term;

aggregate, using the ledger sensor, the data values extracted from the transactions of received multiple trigger events having said information corresponding to the at least one state dependent term, wherein a data value corresponding to the at least one state dependent term is aggregated by the ledger sensor each time a transaction that corresponds to the at least one state dependent term is appended to at least one of the blockchain and the at least one another blockchain;
generate a new transaction to return, to the contextual contract, from the ledger sensor, an aggregated data value from the data values extracted from the transactions having said information corresponding to the at least one state dependent term;
append a block to the blockchain based on the new generated transaction having the aggregated data value, and
execute the contextual contract by the first and second entity using the aggregated data value returned from ledger sensor.

8. The system of claim 7, wherein the smart contract registry data of the database further comprises:
identifiers linking to transactions appended to at least one of the blockchain and the at least one other blockchain;
wherein the ledger sensor is configured to monitor at least one of the blockchain and the at least one other blockchain based at least in part on the linking identifier stored in the smart contract registry.

9. The system of claim 8, wherein the database comprising the smart contract registry is a decentralized database.

10. The system of claim 8, wherein the search terms comprise at least one of meta data, key words, applications, enterprise blockchains, and name spaces.

11. The system of claim 7, wherein the at least one hardware processor is further configured to:
receive a second contextual contract for addition to a blockchain, the second contextual contract including the at least one term;
append a second block to the blockchain based on the received second contextual contract; and
in response to appending the second block, activate the same ledger sensor for the second contextual contract based on the second contextual contract including the at least one term.

12. The system of claim 7, wherein said ledger sensor further performs incrementing a counter in response to detecting the received triggering event, wherein an aggregated data value comprises a counter value of detected triggering events.

13. A non-transitory computer readable medium comprising instructions that when executed by at least one hardware processor, configure the at least one hardware processor to:
receive a contextual contract for addition to a blockchain, the contextual contract specifying a transaction between a first entity and a second entity and including at least one state dependent term that is based on future occurring trigger events;
append a block to the blockchain based on the received contextual contract, the blockchain deployed at a distributed ledger comprising a database shared by multiple computing nodes participating in a system according to a blockchain protocol, the database storing data associated with transactions between entities and the database storing a smart contract registry of search terms associated with transactions that are appended to at least one blockchain;
in response to appending the block, activate a ledger sensor for the contextual contract
monitor, using the ledger sensor, the smart contract registry of the database for the search terms associated with transactions that are appended to at least one of the blockchain and at least one other blockchain responsive to received said future occurring trigger events, said monitoring comprising searching said database for search terms matching the at least one state dependent term provided in said transactions;
extract, using the ledger sensor, a data value relating to a quantity of items transacted in each said transaction associated with a received trigger event having said information corresponding to the at least one state dependent term;
aggregate, using the ledger sensor, the data values extracted from the transactions of received multiple trigger events having said information corresponding to the at least one term, wherein a data value corresponding to the at least one state dependent term is aggregated by the ledger sensor each time a transaction that corresponds to the at least one state dependent term is appended to at least one of the blockchain and the at least one another blockchain;
generate a new transaction to return, to the contextual contract, from the ledger sensor, an aggregated data value from the data values extracted from the transactions having said information corresponding to the at least one state dependent term; and
append a block to the blockchain based on the new generated transaction having the aggregated data value; and
execute the contextual contract by the first entity and a second entity using the aggregated data value returned from the ledger sensor.

14. The non-transitory computer readable medium of claim 13, wherein the smart contract registry data of the database further comprises:
identifiers linking to transactions appended to at least one of the blockchain and the at least one other blockchain;
wherein the ledger sensor is configured to monitor at least one of the blockchain and the at least one other blockchain based at least in part on the linking identifier stored in the smart contract registry.

15. The non-transitory computer readable medium of claim 14, wherein the search terms comprise at least one of meta data, key words, applications, enterprise blockchains, and name spaces.

16. The non-transitory computer readable medium of claim 13, wherein the instructions further configure the at least one hardware processor to:
receive a second contextual contract for addition to a blockchain, the second contextual contract including the at least one term;
append a second block to the blockchain based on the received second contextual contract; and
in response to appending the second block, activate the same ledger sensor for the second contextual contract based on the second contextual contract including the at least one term.

17. The non-transitory computer readable medium of claim 13, wherein said ledger sensor further performs incrementing a counter in response to detecting the received triggering event, wherein an aggregated data value comprises a counter value of detected triggering events.

* * * * *